(12) United States Patent
Barnett (10) Patent No.: US 8,833,046 B2
(45) Date of Patent: Sep. 16, 2014

(54) ROTARY DISK CROP HARVESTING HEADER WITH REARWARDLY SHIFTED TOP CONDITIONING ROLL AND LOWER REAR DEFLECTOR

(71) Applicant: Neil Gordon Barnett, Winnipeg (CA)

(72) Inventor: Neil Gordon Barnett, Winnipeg (CA)

(*) Notice: Subject to any disclaimer, the term of this patent is extended or adjusted under 35 U.S.C. 154(b) by 51 days.

(21) Appl. No.: 13/651,792

(22) Filed: Oct. 15, 2012

(65) Prior Publication Data
US 2014/0102067 A1    Apr. 17, 2014

(51) Int. Cl.
*A01D 61/00*   (2006.01)
*A01D 82/00*   (2006.01)
*A01D 43/10*   (2006.01)
*A01D 34/71*   (2006.01)

(52) U.S. Cl.
CPC .............. *A01D 43/10* (2013.01); *A01D 82/00* (2013.01); *A01D 34/71* (2013.01)
USPC .......................................... 56/16.4 C; 56/157

(58) Field of Classification Search
CPC . A01D 61/006; A01D 61/002; A01D 61/004; A01D 34/665; A01D 34/664; A01D 34/66; A01D 34/667; A01D 34/63; A01D 34/668; A01D 43/10; A01D 82/02
USPC ............ 56/157, 16.4 C, 153, 192, 13.6, 13.7, 56/13.8, 13.9, 14.5
See application file for complete search history.

(56) References Cited

U.S. PATENT DOCUMENTS

| | | | |
|---|---|---|---|
| 3,479,805 A * | 11/1969 | Soteropulos .................... 56/14.1 |
| 4,099,364 A * | 7/1978 | Kanengieter et al. ....... 56/16.4 C |
| 4,821,494 A * | 4/1989 | O'Halloran et al. ........ 56/16.4 C |
| 4,890,445 A * | 1/1990 | Crane ............................. 56/13.6 |
| 4,896,490 A * | 1/1990 | Grenzebach ............... 56/16.4 R |
| 5,404,695 A * | 4/1995 | Gemelli ............................... 56/6 |
| 5,996,323 A * | 12/1999 | Campbell et al. ................... 56/6 |
| 6,158,201 A * | 12/2000 | Pruitt et al. ......................... 56/6 |
| 6,220,007 B1 * | 4/2001 | Doerr et al. ................ 56/16.4 C |
| 6,360,515 B1 * | 3/2002 | Cook ............................. 56/14.1 |
| 7,059,108 B1 | 6/2006 | Rosenbalm et al. |
| RE40,604 E * | 12/2008 | Pruitt et al. ......................... 56/6 |
| 7,730,701 B1 * | 6/2010 | Ehrhart et al. ................. 56/11.9 |
| 8,015,784 B2 * | 9/2011 | Barnett et al. .................. 56/157 |

(Continued)

OTHER PUBLICATIONS

Roller Conditioner with Cross Conveyor Belt for trailed disc mowers, Oct. 30, 2010, Pöttinger Agricultural technology, http://www.poettinger.ca/en_UK/Newsroom/Artikel/3522.

*Primary Examiner* — Árpád Fábián-Kovács
(74) *Attorney, Agent, or Firm* — Kyle R. Satterthwaite; Ryan W. Dupuis; Ade & Company Inc.

(57) ABSTRACT

A crop harvesting header, the top conditioning roll is set back from a conventional position slightly leading the bottom roller so as to instead reside directly over or slightly rearward of the bottom roller, whereby rejection of crop material back into the cutting zone by the top roller is reduced. A rear deflector compensates for a resulting lack of upward trajectory of crop material from the nip, acting to impart a lifting action to same as it exits the rear of the header. Concentrated streams of crop material from pairs of counter-rotating disks may be broken up by a rotational action of the deflector. A front deflector may be included to further prevent crop rejection by the top roller by directing lifted crop material downwardly toward the nip to avoid contact with an upper front quadrant of the top roller.

16 Claims, 7 Drawing Sheets

(56) References Cited

U.S. PATENT DOCUMENTS

| | | | |
|---|---|---|---|
| 8,056,307 B2 * | 11/2011 | Roberge | 56/6 |
| 8,056,310 B2 * | 11/2011 | Whitenight et al. | 56/16.4 C |
| 8,161,719 B2 * | 4/2012 | Barnett et al. | 56/157 |
| 8,166,736 B2 * | 5/2012 | Nickel et al. | 56/16.4 C |
| 8,291,685 B2 * | 10/2012 | Pruit et al. | 56/157 |
| 8,297,033 B2 * | 10/2012 | Pruit et al. | 56/157 |
| 2006/0123759 A1 * | 6/2006 | Fox et al. | 56/16.4 C |
| 2011/0138763 A1 * | 6/2011 | Whitenight et al. | 56/16.4 C |

\* cited by examiner

ROTARY DISK CROP HARVESTING HEADER WITH REARWARDLY SHIFTED TOP CONDITIONING ROLL AND LOWER REAR DEFLECTOR

FIELD OF THE INVENTION

The present invention relates generally to crop harvesting headers with rotary disk cutters and conditioning rolls for cutting and conditioning crop material, and more particularly to such a header in which the top conditioning roll is set back from a conventional position slightly leading the lower conditioning roll and a lower rear deflector is mounted behind the conditioning rolls to smooth out crop flow and aid in swath formation.

BACKGROUND OF THE INVENTION

It has become well known to produce crop harvesting headers which use rotary cutters in replacement of the sickle-knife systems conventionally used in the past. It is well known that such rotary cutters include a cutter bar or gear train which provides the main structural and drive communication components of the cutter. The cutter bar provides a series of longitudinally spaced vertical drive members each of which drives a respective one of a plurality of cutting disks at spaced positions along the cutter bar. The disks are mounted for rotation about respective vertical axes standing upwardly from the cutter bar. The disks, at points on their outer edge, carry a multiple, generally two, flail type blades which rotate with the disk around the vertical axis in a cutting action.

In headers that are configured to not only cut the crop from the field, but also to perform a conditioning function to crimp or break the stalks of the cut crop to achieve faster, more uniform drying of the same in the windrow or swath of material left behind the header, it is common to use a pair of counter-rotating horizontal rollers positioned one above the other behind the rotary cutters. The counter-rotation acts to feed the cut crop material rearward through a nip defined between the two rollers, where close spacing or intermeshing of the rollers at this nip causes the desired conditioning of the material.

Conventionally, the rotational axes of the conditioning rollers are arranged with the axis of the top roller set somewhat forwardly of the axis of the lower roller so that the top roller leads the lower roller by a small amount in the forward working direction in which the header is conveyed over the ground during use. That is, the roller axes are situated in an obliquely sloped plane that is forwardly inclined. This way, the nip between the rollers points obliquely downward in the forward direction and obliquely upward in the rearward direction, so that the crop material is directed somewhat upward from the rollers to discharge cleanly from the rear of the machine to form a swath or windrow behind the header.

Some mower conditioners have added additional features behind the conditioner rolls to further contribute to an upward directional path of the crop material as it moves rearward from the same.

U.S. Pat. No. 7,059,108 (Rosenbalm et al.), issued Jun. 13, 2006 and assigned to Deere & Company, adds a deflector plate behind a forwardly inclined pair of conditioning rollers to intersect a rearward flight path of the crop material from the rollers and steepen the angle of this flight path to increase a force with which the crop material impacts an overhead swath forming shield at the rear of the header.

Towed mower conditioners in the Novacat T series from Pottinger now include models that employ an accelerator roller positioned behind a forwardly inclined pair of conditioning rollers to impart further upward acceleration so as to convey the crop material onto a cross-conveyor for laterally discharging the material from the machine, for example for the purposes of merging the windrow from a side pull mower conditioner unit towed behind a tractor with that of a central mower conditioner header mounted at the front the tractor, whereby material from both units can be efficiently collected in a single pass of the field.

Suitable placement of the set of conditioning rolls behind a rotary cutterbar is difficult, because the hay must be fed into the nip, and contact of the hay with the rollers above and below the top and bottom roller axes can result in the crop being rejected forwardly back into the cutting zone, which can cause poor material flow and poor cut quality. The aforementioned conventional positioning of the top conditioning roll forward of rear roll can significantly contribute to the rejection of crop material back into the cutting zone, as contact of the cut crop material with the top roller above its rotational axis kicks the material forwardly downward, i.e. back toward the disks of the cutterbar.

Applicant has developed a unique mower conditioner configuration that reduces rejection of the cut crop material from the conditioning rollers back into the cutting zone and improves the flow of material through the machine.

SUMMARY OF THE INVENTION

According to a first aspect of the invention there is provided a crop harvesting header comprising:

a header frame arranged to be transported in a forward working direction over ground having a standing crop for harvesting;

a plurality of generally horizontal cutter disks mounted at positions spaced transversely of the header for driven rotation about respective generally upright axes spaced along the cutter bar;

each disk having mounted thereon at a position spaced outwardly from the respective axis thereof at least one cutter blade such that rotation of the disk about its axis causes the standing crop to be cut by the blade as it rotates around the axis on the disk;

a pair of conditioner rolls mounted transversely to the header frame, the conditioner rolls including a top conditioning roll and a bottom conditioning roll which are parallel and arranged for driven counter-rotation about respective top and bottom conditioner rotation axes such that the crop passes rearwardly through a nip between the top and bottom conditioning rolls, the top and bottom conditioner rolls being arranged such that the nip is located behind the disks with the bottom conditioner rotation axis situated at least as far forward on the header frame as the top conditioner rotation axis; and a rear crop deflector mounted transversely to the header frame behind the pair of conditioner rolls and arranged to deflect the cut crop upwardly as said cut crop moves rearwardly from the conditioner rolls.

Preferably the top rotational axis about which the top conditioner roll is driven is located rearward of the bottom rotational axis about which the bottom conditioner roll is driven.

Preferably the rear crop deflector comprises a deflector roller supported for rotation about a deflector rotation axis oriented transversely of the frame.

Preferably the deflector roller is arranged for driven rotation about the deflector rotation axis in a direction conveying the cut crop material rearwardly over the deflector roller.

Preferably the crop conditioner rolls and the deflector roller are positioned such that a greatest radial extent of the deflector roller moves upwardly and rearwardly as it crosses through a plane bisecting the nip.

Preferably the deflector roller is in a non-intermeshing relationship with each conditioner roll.

Preferably the top and bottom conditioner rollers intermesh with one another.

Preferably the deflector roller comprises circumferentially spaced ribs.

Preferably the deflector roller and the conditioning rolls share a common drive system.

Preferably the deflector roller is driven off of one of the conditioning rolls.

Preferably the common drive system comprises a flexible drive member entrained about respective shafts of the deflector roller and the one of the conditioning rolls.

Preferably the flexible drive member is a belt.

Preferably the deflector roller is adjustable between different positions relative to each of the conditioning rolls, and the common drive system comprises a tensioning mechanism for setting a tension of the flexible member in each of said positions.

Preferably the deflector roller is supported on the frame by an adjustable bracket that is pivotal about a pivot axis parallel to the deflector rotation axis and slidable back and forth on a sliding axis perpendicular to the pivot axis, whereby for each position of the deflector roller about the pivot axis, the bracket is slidable back and forth to adjust the tension of the flexible member.

In another embodiment, the rear crop deflector may comprise a deflector panel.

Preferably the disks comprise a central set of disks disposed inwardly of opposing ends of the conditioning rollers, the central set of discs being arranged in cooperative pairs each comprising two adjacent disks that rotate in opposite directions so as to tend to convey crop material in a stream between the adjacent disks.

Preferably the conditioning rolls and the deflector are mounted in a discharge opening of the frame from which the crop is discharged rearwardly to form a swath directly behind the header.

According to a second aspect of the invention there is provided a crop harvesting header comprising:

a header frame arranged to be transported in a forward working direction over ground having a standing crop for harvesting;

a plurality of generally horizontal cutter disks mounted at positions spaced transversely of the header for driven rotation about respective generally upright axes spaced along the cutter bar;

each disk having mounted thereon at a position spaced outwardly from the respective axis thereof at least one cutter blade such that rotation of the disk about its axis causes the standing crop to be cut by the blade as it rotates around the axis on the disk;

a pair of conditioner rolls mounted transversely to the header frame, the conditioner rolls including a top conditioning roll and a bottom conditioning roll which are parallel and arranged for driven counter-rotation about respective top and bottom conditioner rotation axes such that the cut crop from the disks passes rearwardly through a nip between the top and bottom conditioning rolls; and a rear crop deflector mounted transversely to the header frame behind the pair of conditioner rolls and arranged to deflect the cut crop upwardly as said cut crop moves rearwardly from the conditioner rolls;

wherein the disks comprise a central set of disks disposed inwardly of opposing ends of the conditioning rollers, the central set of discs being arranged in cooperative pairs each comprising two adjacent disks that rotate in opposite directions so as to tend to convey crop material in a stream between the adjacent disks.

According to a third aspect of the invention there is provided a crop harvesting header comprising:

a header frame arranged to be transported in a forward working direction over ground having a standing crop for harvesting;

a plurality of generally horizontal cutter disks mounted at positions spaced transversely of the header for driven rotation about respective generally upright axes spaced along the cutter bar;

each disk having mounted thereon at a position spaced outwardly from the respective axis thereof at least one cutter blade such that rotation of the disk about its axis causes the standing crop to be cut by the blade as it rotates around the axis on the disk;

a pair of conditioner rolls mounted transversely to the header frame, the conditioner rolls including a top conditioning roll and a bottom conditioning roll which are parallel and arranged for driven counter-rotation about respective top and bottom conditioner rotation axes such that the crop passes rearwardly through a nip between the top and bottom conditioning rolls, the top and bottom conditioner rolls being arranged such that the nip is located behind the disks with the bottom conditioner rotation axis situated at least as far forward on the header frame as the top conditioner rotation axis.

According to another aspect of the invention, there is provided a crop harvesting header comprising:

a header frame arranged to be transported in a forward working direction over ground having a standing crop for harvesting;

a plurality of generally horizontal cutter disks mounted at positions spaced transversely of the header for driven rotation about respective generally upright axes;

each disk having mounted thereon at a position spaced outwardly from the respective axis thereof at least one cutter blade such that rotation of the disk about its axis causes the standing crop to be cut by the blade as it rotates around the axis on the disk;

a pair of conditioner rolls mounted transversely to the header frame, the conditioner rolls including a top conditioning roll and a bottom conditioning roll which are parallel and arranged for driven counter-rotation about respective top and bottom conditioner rotation axes such that the crop passes rearwardly through a nip between the top and bottom conditioning rolls, the top and bottom conditioner rolls being arranged such that the nip is located behind the disks with the top conditioner rotation axis situated rearwardly of the bottom conditioner rotation axis; and a rear crop deflector mounted transversely to the header frame behind the pair of conditioner rolls and arranged to deflect the cut crop upwardly as said cut crop moves rearwardly from the conditioner rolls;

wherein the rear crop deflector is maintained in a position that is free of any contact with either of the conditioner rolls, is in non-intermeshing relationship with each of said conditioning rolls at a distance spaced rearwardly therefrom, is intersected by a bisecting plane that bisects the nip, and has a forwardmost point that is located at a spaced distance downwardly from the bisecting plane in order to impart upward and rearward movement through the bisecting plane to crop material arriving at said forwardmost point of the rear crop deflector from the nip of the conditioning rolls.

BRIEF DESCRIPTION OF THE DRAWINGS

In the accompanying drawings, which illustrate exemplary embodiments of the present invention.

DETAILED DESCRIPTION

Figure 1:
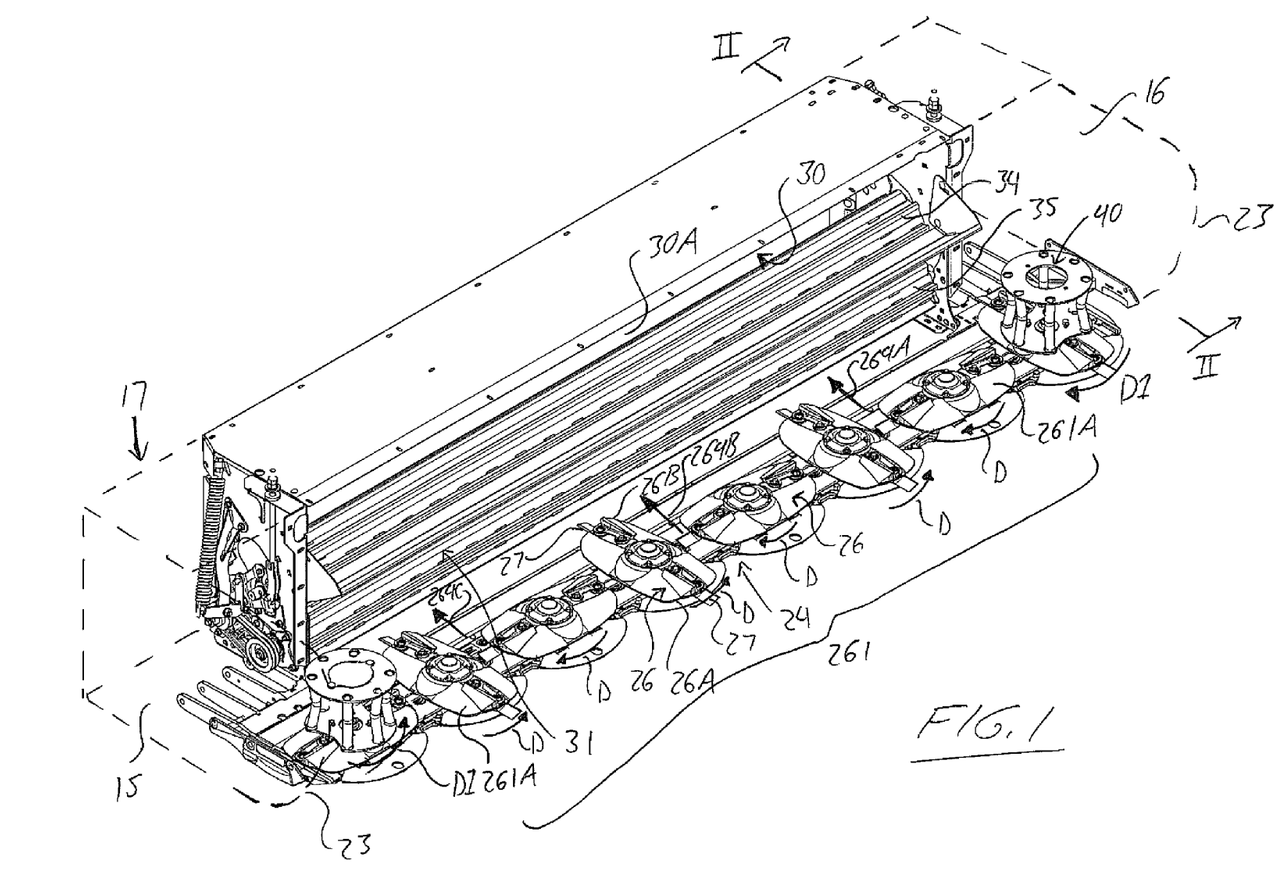
FIG. 1 is a schematic front end perspective view of a mower conditioner header according to a first embodiment of the present invention, employing a rearwardly inclined conditioner roll arrangement and a rear deflector roller.

In FIG. 1 is shown schematically a mower conditioner header for attachment to conventional swather tractor of the well known type having driven front ground wheels and rear castor ground wheels. In an alternative arrangement, the mower conditioner header may be configured for use in a pull-type unit for towing behind a tractor, and the construction of a suitable hitch and support wheel configuration for such a pull type device is well known to a person skilled in the art, and thus not described in detail herein.

A front support assembly of the tractor that carries the header 14 includes left and right lift arms, which carry the header in a floating action across the ground along skid plates (not shown) of the header. The header includes outer side walls 15 and 16 forming part of a frame 17 attached to the conventional transport system of the tractor. The outer side walls are shown only schematically in broken lines, and only in FIG. 1, with other parts of the frame structure omitted throughout the drawings, as the frame and attachments of other components thereto are of known configuration used in similar commercially available machines.

The frame 17 includes a main transverse beam which is attached to the tractor and carries the outer side walls 15 and 16. The outer side walls each comprises a vertical wall extending forwardly to a front edge 23 in front of the cutter bar 24. The outer side wall is vertical and the front edge 23 lies in a vertical plane of the outer side wall so as to confine crop material to the interior of the header between the outer side walls for cutting action effected by the cutter bar 24.

Within the cutter bar 24 is provided a gear train (not shown) of meshing gears carried on suitable bearings so as to provide communication of drive of a number of vertical shafts carried on the cutter bar, each for rotating a generally horizontal disk 26 about a vertical axis of the shaft. The disks are substantially identical. The disks are generally elliptical in shape so that a length between two ends 26A and 26B is significantly greater than a distance between the side edges in a direction at right angles to the length. At each of the ends 26A and 26B is mounted a respective one of a pair of flails 27 each for pivotal movement about a flail mounting pin. The mounting pins are arranged at the ends and thus at the maximum extent of the disk so that the flails project outwardly beyond the edges of the disk for rotation in a common horizontal cutting plane, generally parallel to the plane of the cutter bar, in a cutting action.

The disks are intermeshed so as to driven synchronously and they are arranged at 90° phase difference so that adjacent pairs of the disks are at 90° offset as they rotate to avoid interference between the disks and the blades 27 carried thereby.

The cutter bar of this general construction is of a conventional nature and many examples of a commercial arrangement of this type are available in the market place. Thus the details of the cutter bar and its mounting are well known to one skilled in the art and further details can be obtained from such commercial devices.

The cutter bar 24 is wider than a discharge opening 30 with an entrance mouth 30A defined between a pair of inner side walls 32 situated parallel to and between the outer side walls 15 and 16 at positions behind the cutter bar. A conditioning system 31 is mounted in the discharge opening 30. Thus the crop material passes over and between the disks when cut and also must be converged from the full cut width into the entrance mouth 30A of the discharge opening 30.

The inner side walls 32 of the discharge opening 30 are vertical and parallel and extend rearwardly from the mouth 30A, and confine the crop material between them so that the crop material passes through the discharge opening over a width that is less than the overall width of the header. Accordingly, the inner side walls 32 are spaced inwardly from the respective end walls 15 and 16 of the header. The crop conditioning system 31 is arranged to span the width of the crop discharge opening so that the width of the conditioning system is equal to the width of the discharge opening. The conditioning system comprises a top roller 34 and a bottom roller 35 which have flutes 36 arranged in a meshing arrangement so that the crop material passing through the discharge opening passes through a nip 37 between the conditioning rolls and is discharged from the rear of the conditioning system, form where it is to be formed into a swath of material to be discharged onto the ground for subsequent collection from the field as required.

The disks 26 mounted on the cutter bar 24 include a series of central disks 261 which are located in front of the discharge opening 30. Outward of these disks on either side is provided a single outer disk indicated at 262. These disks are arranged to rotate inwardly, as indicated by arrows D1 in FIG. 1, so that the front extremity and the blade carried thereby rotates in the direction indicated to carry the crop material which is cut by those disks inwardly toward the discharge opening.

The outer disks 262, and not the central disks 261 positioned therebetween, each carry an impeller 40 mounted on the disk so as to be carried thereby and driven thereby and so as to be directly co-axial with the disk 262. A hanging impeller can be used to replace this impeller also co-axially arranged with the corresponding disk 262 or the axis of the impeller may be offset from the axis of the disk. It will be appreciated that the disk and the impeller co-operate to assist in carrying the crop material inwardly toward the discharge opening and to resist the crop material from moving directly rearwardly over the disks 262. The arrangement and construction of the impeller is described in detail in the above US Published Application 2008/0066439 and Canadian application 2,578,907, the details of which are incorporated herein by reference and to which reference may be made for those details.

The top conditioning roller 34 is located at an elevation above the bottom conditioning roller 35. These rollers define between them the nip 37 through which the crop material is controlled to pass rearward from the cutter bar for subsequent discharge through the rear end of the header. The top conditioning roll 34 and the bottom conditioning roll 35 are parallel and arranged such that the crop passes through the nip 37 between the top and bottom conditioning rolls. The top and bottom conditioning rolls are arranged such that the nip 37 is raised above the common cutting plane of the cutterbar and is located behind the disks 26. The top and bottom conditioning rolls 34, 35 each comprise a cylindrical body 77, mounted for rotation about an axis 78, 79 thereof. In one example, on the cylindrical body 77 is mounted a series of longitudinally extending, angularly spaced flutes 36 arranged such that the flutes 36 of the top roll 34 mesh with the flutes of the bottom roll 35 in the conditioning action, as is well known.

However the present invention is also applicable to conditioning rolls of the type which have no flutes or ribs so that the conditioning action is effected by a high crushing force between two plain rollers. The rollers can be smooth or may include grooves or indentations which are not intended to mesh in the crushing action. Crushing conditioner rolls of this type are well known to persons skilled in this art and different designs may be selected and used as will be known to such persons.

The illustrated embodiment is presented with an eight disk mower, which features six central discs 261 that are positioned in front of the discharge opening so that the set of six disks lies entirely between the inner side walls 32. These six central disks are arranged in three counter-rotating pairs of disks, where the two disks of each pair rotate in opposite directions such that the crop material cut by the pair tends to pass between the two disks of that pair. Wider machines may be produced, for example with a ten or twelve disc mower again featuring three pairs of counter-rotating central discs in front of the discharge opening, and two or three outer end discs at each end of the series of central discs.

In the illustrated embodiment, where there is only a single outer disk 262 at each end of the set of central discs 261, and each end disk 262 is located in-line with the inner end wall 32 at the respective side of the discharge opening. That is, an imaginary horizontal line extending forwardly from the inner end wall 32 in the plane of that wall intersects the disk 262 at a horizontal plane of the disk. This imaginary line is typically located at a position on the disk spaced inwardly from the disk's rotational axis but can alternatively be outside the axis of the disk 262. The axis and main body of each end disk 262 is mounted outboard of the respective imaginary line of the opening so that the adjacent disks at the respective end of the set of central disks defines a cutting circle which is closely adjacent or at the line. Thus the majority of each end disks 262 is outboard of the respective line.

The end disk 261A at each end of the series of central disks 261, i.e. the disk inwardly adjacent the respective outer disk 262, rotates in a direction opposite that outer disk 262, as shown in FIG. 1, so that the front of disk 261 is rotating inwardly toward the center of the discharge opening. From hereon to the center of the series of central disks, each disk then rotates in the opposite direction of that preceding it, so as to cooperate with that preceding disk to form a cooperative, counter-rotating pair. Accordingly, at each counter-rotating pair of disks, the crop material cut by the disks tends to be swept into a respective zone between the pair, as shown schematically at arrows 264A, 264B, and 264C at the three resulting zones of the illustrated embodiment. The crop material is fed rearwardly into the conditioning system from the three zones in respective concentrated streams of material.

Other disc arrangements providing counter-rotating pairs of central disks in front of the discharge opening may be used to similar provide concentrated streams of crop material through the conditioning system, including the ten and twelve disk cutterbar configurations disclosed in U.S. Application Publication No. 2010/0269475 assigned to the present assignee, where auger elements are additionally employed behind the cutterbar and ahead of the conditioning rollers to contribute to conveyance of crop material from disks situated outwardly beyond the discharge opening in a direction inwardly toward that opening.

While employing counter-rotating pairs of disk cutters like in present Assignee's aforementioned prior application, the present invention departs from previous header designs in unique relative positioning of its conditioner rolls and the addition of a deflector behind the same. The following reconfiguration of the roller positions relative to conventional arrangements reduces rejection of the crop material from the inlet side of the conditioning rollers back to the cutting zone, while the addition of the deflector compensates for a downward trajectory of the crop material as it exits the reconfigured rollers, and further improves crop flow through header in embodiments where a rotational deflector roll is employed.

Figure 2:
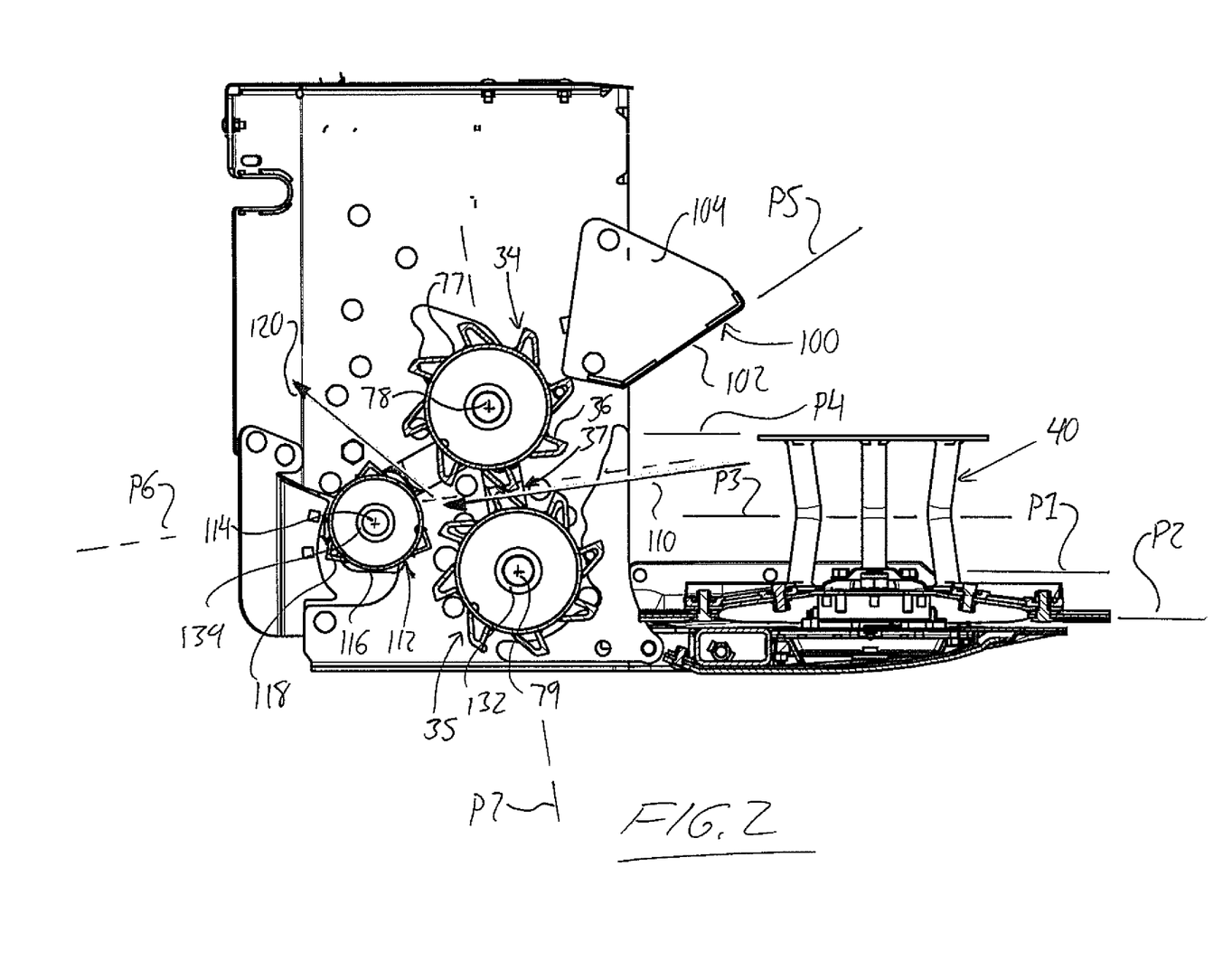
FIG. 2 is a cross-sectional view of the header of FIG. 1 as taken along line II-II thereof.
Figure 3:
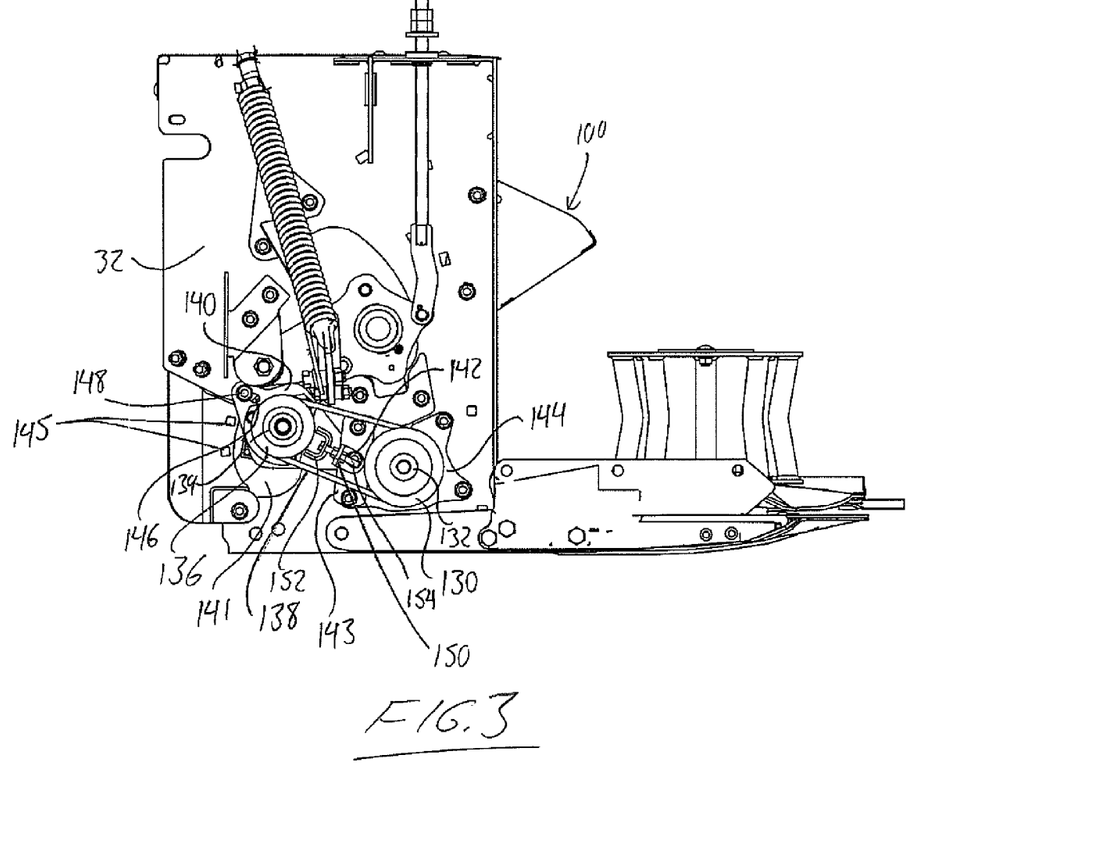
FIG. 3 is an elevational end view of the header of FIG. 1.
Figure 4:
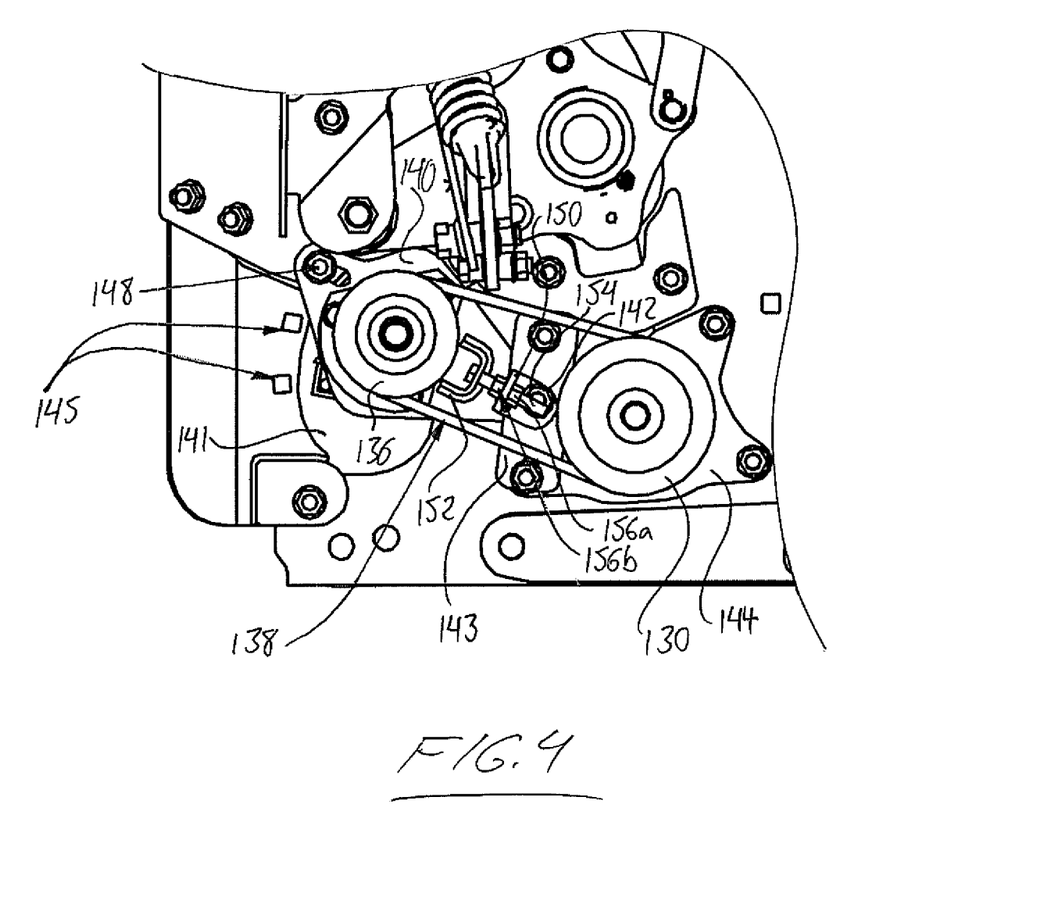
FIG. 4 is a partial closeup of the end view of FIG. 3.
Figure 5:
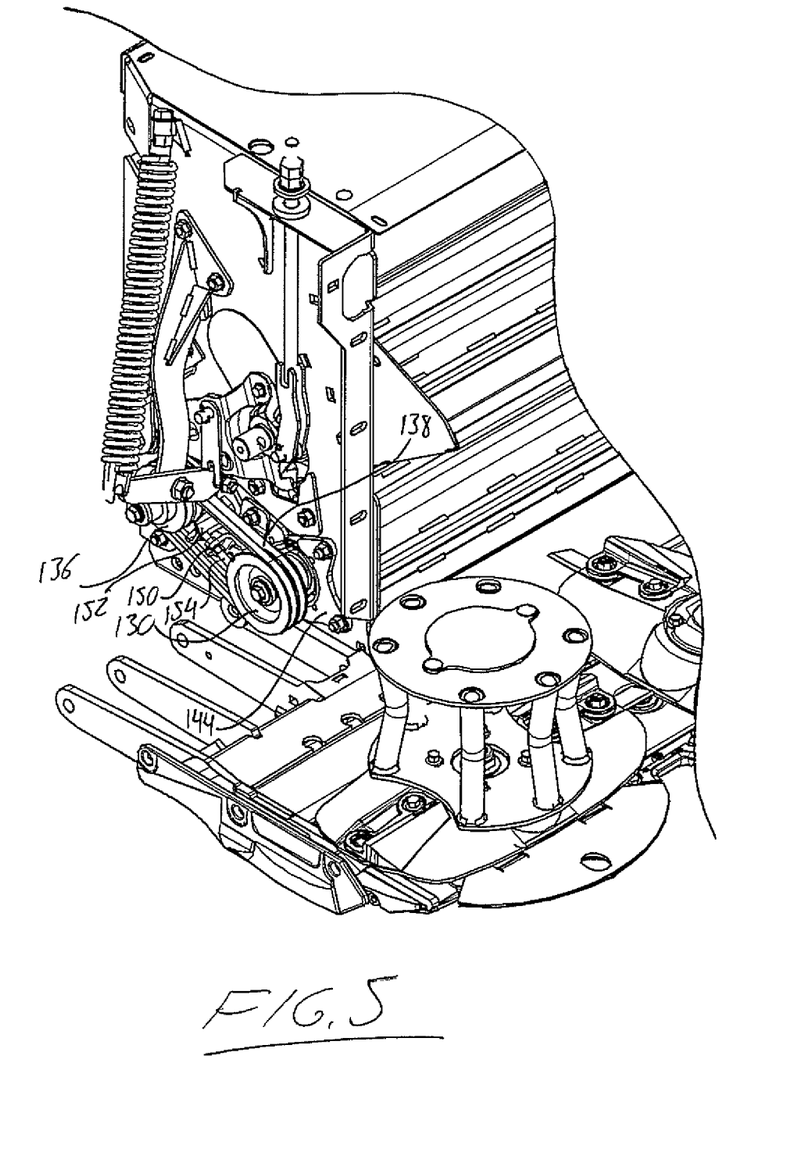
FIG. 5 is a partial closeup of the perspective view of FIG. 1.
Figure 6:
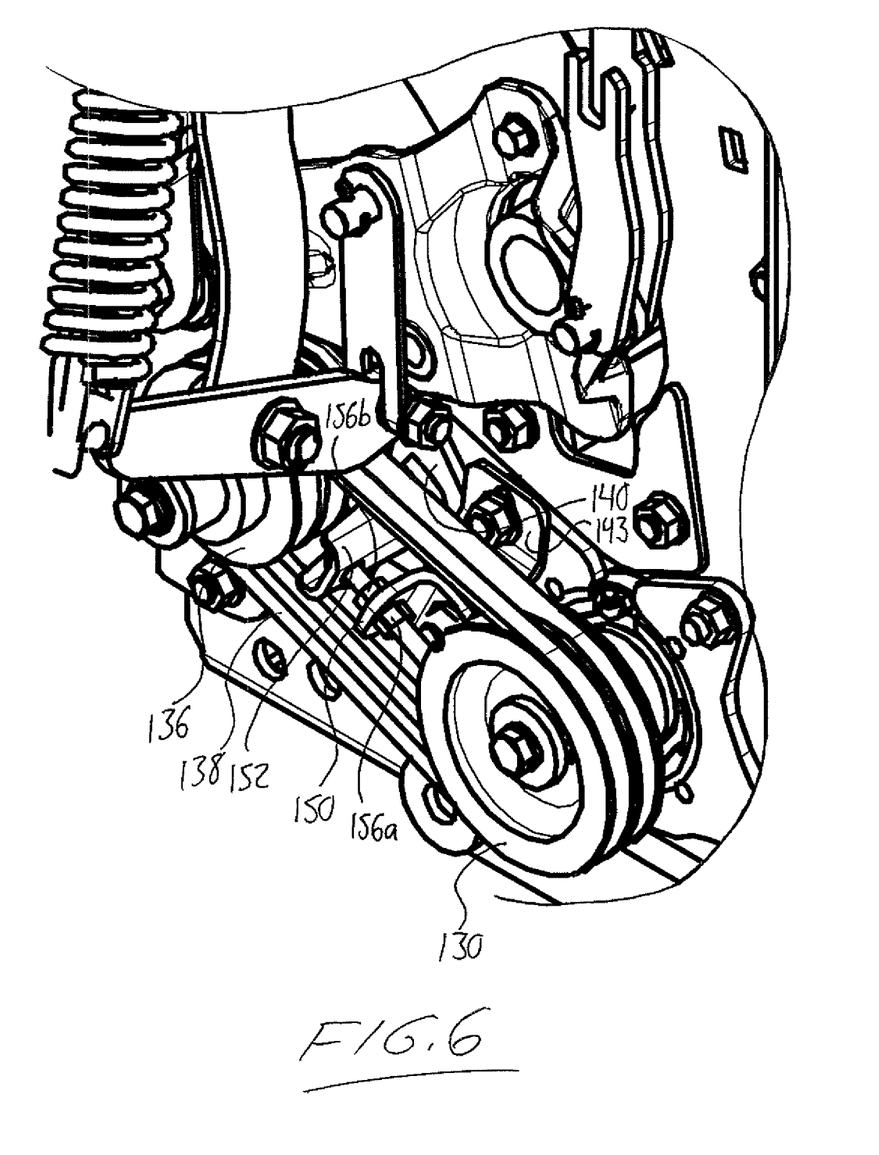
FIG. 6 is a partial closeup of the perspective view of FIG. 6.

With reference to FIG. 2, the top roller 34 preferably positioned with its rotational axis 78 set a short distance rearward from the rotational axis 79 of the bottom roller 35, or at least in a position with the top roller's axis 78 no further forward than the bottom roller's axis 79. Accordingly, the two rotational axes of the conditioning rollers preferably reside in a rearwardly inclined plane that slopes obliquely upward moving from the front of the machine to the rear, or at least in a vertical plane so that no part of the top roller resides forwardly of the bottom roller.

The axis 79 of the lower conditioning roll 35 resides at a height generally matching a horizontal plane P1 marking the top of each disk of the cutter bar, thereby placing the lower conditioner roll axis 79 only a short height above the horizontal cutting plane P2 marked by the flails or blades 27 of the disk, and at a height below the plane P3 marking the halfway point of the height of the impellers mounted on the outer disks 262 (i.e. the plane at which the hourglass shape of the illustrated impeller's is narrowest). As a result, the lowermost point of the rotational path of the bottom conditioning roll 35 lies below the upper plane P1 of each disk, and even below the common cutting plane P2 of the cutterbar. The nip 37 of the conditioning rolls 34, 35 lies at an elevation above the disks, but below a horizontal plane P4 containing the top ends of the impellers 40 mounted on the outer disks 262.

A front deflector shield 100 features a deflection plate 102 having an elongated dimension running transversely to the frame between mounting brackets 104 that are attached to the inner end walls 32 near the front edges thereof that bound opposite sides of the entrance mouth 30A of the discharge opening. The deflection plate 102 thus spans across the discharge opening at or shortly in front of the entrance mouth 30A, and the brackets 104 are suitably shaped and positioned to carry the deflection plate in an oblique plane P5 matching or closely following a plane that is tangential to the exterior of the cylindrical body 77 of the top conditioning roll 34 at a lower front quadrant thereof. A downward facing side of the deflection plate 102 thus faces downwardly and forwardly toward the cutterbar so that cut crop material deflected upwardly and rearwardly from the cutterbar during the cutting action is redirected downwardly toward the nip 37 between the conditioning rolls at the upwardly-pointing inlet at the front side thereof.

The setting of the top conditioning roll back from its conventional position so as to sit over partially over, but slightly back from, the bottom roll reduces a tendency for the cut crop material from the cutterbar to contact the front of the top roll at a position above its rotational axis 78, where the flutes or ribs of the roller would impart a forwardly directed impact against the material. When also added, the front deflector shield 100 further reduces the possibility of such rejection of the crop material by the top roll. The described low positioning of the bottom conditioning roll 35 likewise minimizes the opportunity for the cut crop material to contact the front of the bottom roll at a position below its rotational axis 79, thereby similarly avoiding a forwardly directed impact of the conditioning roll against the crop material. Accordingly, the described positioning of the two conditioning rolls reduces rejection of crop material back toward the cutterbar to improve flow rearward through the conditioning system.

Still referring to FIG. 2, arrow 110 indicates the direction in which crop material is conveyed through the nip by the conditioner rolls, which due to the rearwardly inclined positioning of the rolls has a downward slope. In order to deflect the crop material upwardly as its exits the conditioning rolls so that the material discharges upwardly from the rear of the header to ensure that the material clears the conditioning rolls before impacting the ground, a rear deflector roller 112 is added behind the conditioning rolls. Like the conditioning rolls, the deflector roller 112 is an elongated member whose longitudinal axis 114 lies horizontally transverse to the frame to define a rotational axis about which the roller is rotatable in a position spanning horizontally across the discharge opening 30 between the inner side walls 32. The deflector roller axis 114 is parallel to the conditioner roll axes 78, 79.

As illustrated, the deflector roller 112 may be smaller in cross-sectional size than the equal size conditioner rolls, and may be formed of a cylindrical body 116 having a plurality of circumferentially spaced ribs 118 or flutes running longitudinally along the exterior of the cylindrical body. However, the deflector roller does not intermesh with either conditioning roll, and so the number of ribs or flutes need not be related to the number of ribs or flutes on the conditioning rolls.

The rotational axis 114 of the rear deflector 112 is situated below a plane P6 that bisects the nip 37 of the conditioning rollers, and is spaced from that plane by a perpendicular distance less than the radius of the cylindrical body of the deflector roller. Bisecting plane P6 is perpendicular to the rearwardly inclined plane P7 that contains the axes of the conditioning rolls, and resides centrally between the circumferences of the conditioning roll cylinders 77 in this plane. Bisecting plane P6 is thus parallel to tangential planes of the conditioning rolls at the nip 37 thereof. With this positioning of the deflector roller axis, the outer surface of the deflector's cylindrical body and the tips of the flutes or ribs thereon move upward and rearward as they pass through the plane P6 in front of the deflector axis 114. Accordingly, as crop material exits rearwardly and downwardly from the nip 37 along plane P6 (as marked by arrow 110), the deflector roller 112 continues the rearward conveyance of the crop material, while imparting an upward directional component to same, as indicated by arrow 120. This lifting of the crop material for upwardly-sloped discharge from the rear of the header increases the available time for each piece of crop material to clear the conditioning rolls before falling to the ground to form the windrow.

When used in conjunction with a cutter bar employing the above described counter-rotating pairs of disks, the deflector roller has been found to present a further functional result by contributing to more uniform distribution of crop material across the width of the header during its discharge from the rear end thereof. That is, the rear deflector acts to help spread out the material as it comes through the conditioner in streams of relatively high concentration that resulted from the counter-rotating pairs of disk cutters. Use of counter-rotating pairs of disk cutters without a deflector roller tend to produce denser streams of crop material in the flow out the rear of the machine compared to embodiments employing a rear deflector roller.

Turning to FIGS. 3 to 6, which show an exterior side of one of the inner end walls 32, attention is now given to mechanisms for driving and adjusting the deflector roller 112.

To drive rotation of the deflector roller, a first pulley 130 is fixed on a central end shaft 132 of the bottom conditioning roll 35 outside the inner end wall 32 at one end of the discharge opening. The end shaft of the lower conditioning roll is rotatably carried on the frame in a conventional manner by a suitable bearing mounted on the inner end wall, as the other end shaft at the other end of the conditioning roll. A central end shaft 134 of the deflector roller 112 passes through the same inner end wall 32 as the conditioning roll end shaft on which pulley 130 is mounted, and this deflector roller end shaft 134 carries a second pulley 136 fixed thereon. A flexible belt 138 is entrained about the two pulleys 130, 136, whereby driven rotation of the deflector roller is effected by the rotation of the bottom conditioner roller.

The conditioning system is driven by conventional means at the opposing end of the header, such means being well known and thus not illustrated or described in detail herein. Use of the belt and pulleys may be replaced by use of a flexible chain and pair of sprockets. Either way, the linking of the deflector roller to one of the conditioning rolls by a flexible drive member allows both the conditioning system and the deflector roller to be driven through a single, shared rotational drive source.

The rear deflector is adjustable in position. At each inner end wall 132, a pivotal mounting plate 140 has a forward end thereof pivotally coupled to the inner end wall 132 so as to pivotal parallel to the vertical plane of the inner end wall 132 at the exterior side thereof. Each pivotal mounting plate 140 carries a bearing for rotatably supporting a respective end shaft of the deflector roller, and each inner end wall 132 has an opening 141 through which the respective deflector end shaft extends, and in which that shaft can move up and down along a generally arcuate path under pivoting of the respective pivotal mounting plate 140 about its horizontal pivot axis. The pivot axis of each pivotal mounting plate is defined by a nut and bolt fastener 142 attaching the pivot plate to a support bracket 143 fixed on a stationary mounting plate 144 that carries the support bearing for a respective end shaft of the lower conditioning roll, whereby the fastener 142 can be loosened and tightened to temporarily allow pivoting of the pivot plate 140 to adjust the deflector roller position before locking the same in place.

Along the rear edge of the opening 141 through which the deflector roller end shaft 134 extends are a series of multiple fastener holes 145 passing through the inner wall 132 at spaced apart locations on an arcuate path so as to be radially equidistant from the pivot plate's pivot axis. Adjacent a rear end of the pivot plate 140, an elongated slot shaped hole 146 in the bracket 140 is alignable with any select one of the fastener holes 145 in the inner end wall 132 under pivoting of the bracket 140 about its axis. Each fastener hole 145 defines a respective selectable orientation angle for the pivot plate 140, and thus a respective selectable position for the deflector roller. Accordingly, the deflector roller can be repositioned to any of the positions by loosening the pivot fastener 142, removing a retaining bolt fastener 148 from the slot shaped hole 146 and the one of the fastener holes 145 currently aligned therewith, pivoting the pivot plate 140 to move the slot-shaped hole 146 to a different one of the fastener holes 145, and then reinserting the retaining bolt fastener 148 through the slot shaped hole 146 and the new one of the fastener holes 145 now aligned therewith.

As the pivot plate 140 does not pivot directly on the axis of the lower conditioner roll, but rather about a pivot axis situated at a similar height but rearward therefrom, a mechanism for tensioning the belt 138 according to the newly selected position is provided. For this purpose, the hole through which the pivot-providing bolt 142 of the pivot plate 140 engages is elongated in the same direction as the slot-shaped hole 146 at the opposing rear end of the pivot plate 140. This way, when the pivot plate 140 is held at a selected one of the fastener holes 145 in the inner end wall 132 and the pivot and fastening bolts 142, 148 are in a loosened state, the pivot plate can be displaced back and forth along the direction of elongation of the two holes in the pivot plate 140. That is, in additional to its ability to pivot about the pivot bolt 142 when same is loosened, the pivot plate 140 can be displaced in both directions along an axis perpendicular to the pivot axis so as to control the tension of the belt 138 entrained about the two pulleys 130, 136. The mechanism for displacing the pivot plate back and forth along this displacement axis is described as follows.

A right angle bracket 150 has a first leg that lies parallel with the portion of the support bracket 143 through which the pivot bolt 142 passes, and that resides on the outer side of the support bracket 143 so that the pivot plate 140 and right angle bracket 150 lie on opposing sides of this portion of the support bracket 143. This first leg of the right angle bracket has a non-elongated hole therein that aligns with the non-elongated hole in the support bracket 143 and the elongated front end hole of the pivot plate, and the pivot bolt 142 passes through all three of these holes. The second leg of the right angle bracket projects perpendicularly from the first, outwardly away from the support bracket 143, and faces toward the deflector roller pulley 136.

A U-shaped bracket 152 is fixed on the outer face of the pivot plate 140 at a position between the deflector roller pulley 136 and the support bracket 143, with the U-shaped aspect of its structure referring to its cross section in planes that are parallel to the pivot plate from which the U-shaped bracket 152 projects. The central web of the U-shaped bracket 152 faces and lies parallel to the second leg of the right angle bracket 150, and the two parallel legs of the U-shaped bracket project toward the deflector roller pulley 136 at the opposite side of the central web. An adjustment bolt 154 passes perpendicularly through the central web of the U-shaped bracket 152 and the second leg of the right angle bracket 150. The head of the adjustment bolt 154 lies between the legs of the U-shaped bracket, and is fixed to the side of the central web that faces the deflector roller pulley 136. A pair of nuts 156a, 156b are threaded on the adjustment bolt to reside on opposing sides of the second leg of the right angle bracket 150, as best shown in the enlarged views of FIGS. 4 and 6.

Through this arrangement, when the pivot bolt 142 and securing bolt 148 of the pivot plate 140 are in a loosened state, the rotation of either nut 156a, 156b in a direction tightening the same against the second leg of the right angle bracket 150 will drive linear displacement of the adjustment bolt 154 along its axis in a respective direction. The bolt lies parallel to the elongation axes of the two elongated holes in the pivot plate, and accordingly the displacement of the bolt 154, via the fixation of its head to the pivot plate 140 by the U-shaped bracket 152, drives the pivot plate 140 along its displacement axis. Accordingly, tightening of the front nut 156a against the front side of the right angle bracket 150 moves the pivot plate 140, and the deflector roller and corresponding pulley 136, in a forward direction toward the conditioning roll pulley 130 to decrease the tension of the belt 138, while tightening of the rear nut 156b against the rear side of the right angle bracket moves the pivot plate, deflector roller and pulley rearwardly away from the conditioning roll pulley 130 to increase the belt tension.

The above arrangement thereby enables driving of the rear deflector roller by the same drive system used to effect rotation of the bottom conditioning roll while allowing repositioning of the rear deflector roller relative to the bottom conditioning roll.

The bottom conditioning roll is mounted in a stationary position, while the top conditioning roll is movable up and down relative to the bottom conditioning roll at each inner end wall along an arcuate path set by a pivotal mount carrying the bearing that supports the respective end shaft of the top conditioning roll. A tensioning system applies tension to the pivotal support of the top conditioning roll in order to bias the same downward, thereby acting in a manner tending to close or reduce the nip 37. The independent floating movement of the ends of the top roller acts to accommodate variation in the amount of crop material moving through the nip, while the tension forcing the rolls together ensures a conditioning action on the crop material passing through the nip.

For adjustable-tension, floating support of the top roller, the illustrated embodiment employs a system generally of the type disclosed in U.S. Pat. No. 8,056,311 issued to the present Assignee, the details of which are incorporated herein by reference.

Figure 7:
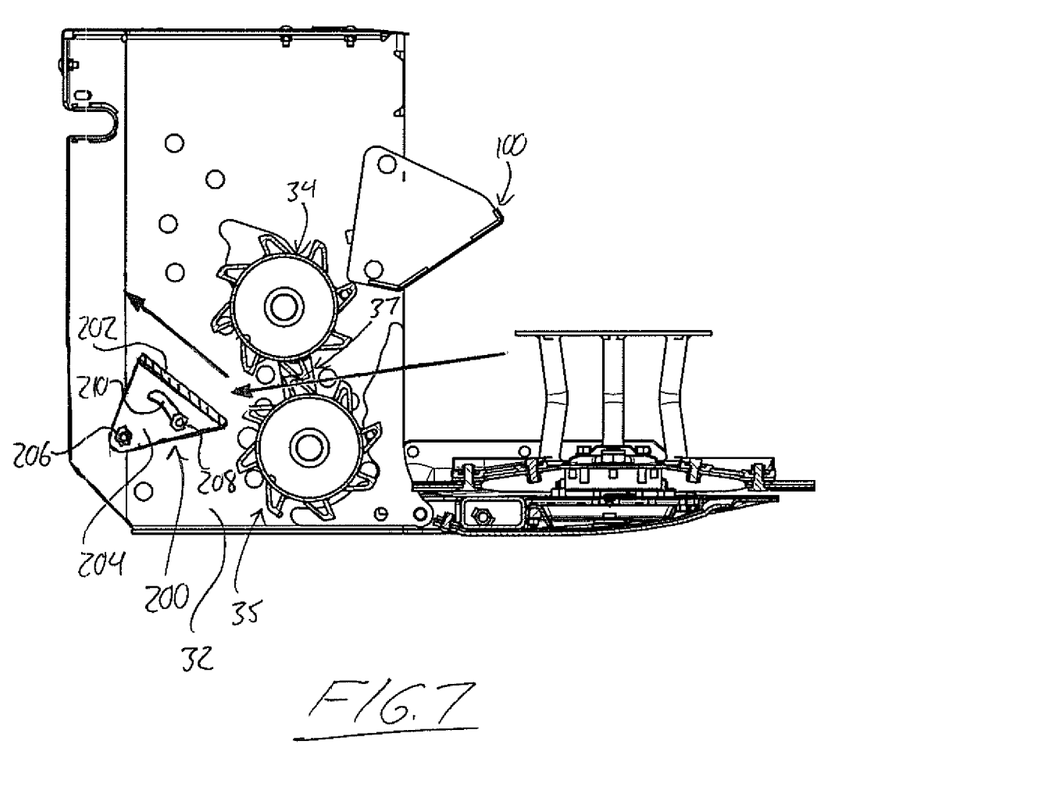
FIG. 7 is a cross-sectional view, as taken at the same plane as FIG. 2, of a second embodiment of the present invention employing the rearwardly inclined conditioner roll arrangement and a rear deflector plate or panel.

FIG. 7 schematically illustrates a further embodiment of the invention, in which the rotary or roller-type rear deflector of the first embodiment is replaced by a plate or panel type rear deflector 200 that remains stationary during use of header. A flat plate 202 transversely spans the discharge opening of the header behind the conditioning rolls 34, 35, and lies in a rearwardly inclined oblique plane so as to position a lower front edge of the plate 202 at an elevation below that of the nip 37 and at a distance spaced rearward from the lower conditioning roll 35, and a top rear edge of the plate 202 at a greater elevation further back near the rear exit of the discharge opening. The deflector plate 202 may be adjustably mounted to the header, for example by way of end plates or brackets 204 each fixed to a respective end of the deflector plate 202 and coupled to a respective one of the inner end walls 32 of the header frame at the inner face thereof. The illustrated end bracket employs an adjustable mounting like that employed for the deflector plate of the aforementioned Deere patent, where a pivot bolt 206 passing through each end plate 204 and respective inner end wall 32 of the header frame cooperates with a securing bolt 208 also passing through the end wall 32 via a slot-shaped hole 210 that passes through the end plate 204 along an arcuate path about the axis of the pivot bolt 206. Loosening the securing bolts 208 allows the deflector assembly 202, 204 to pivot about the coincident axes of the pivot bolts via the aligned arcuate slots 210, whereby this tilting of the assembly changes the slope angle of the oblique deflector plate 202.

Other adjustable mounting arrangements for a stationary deflector are possible, for example using multiple sets of fastener holes, whereby the deflector assembly can be removed from one set, and reinstalled at another to reset the height and/or angle of the deflector plate.

The deflectors of the present invention provide unforeseen advantage over those of the prior art when used in conjunction with the counter-rotating disk pairs of the cutter bar and/or the rearwardly inclined configuration of the pair of conditioning rollers. Cooperating with the counter-rotating discs, the deflector roller increases the uniformity of crop flow out of the rear of the header, for example for improved swath formation as the material falls ground straight behind the header in the shadow of the same (i.e. as opposed to Pottinger's use of a roller to elevate the crop from forwardly inclined conditioner rolls onto a cross-conveyor for swath formation laterally outward from the shadow or trial of the header). Cooperating with the rearwardly inclined conditioning rolls, the deflector roller or deflector plate/panel provides clean discharge and swath formation at the rear outlet of the discharge opening, while the lack of forward incline at the conditioning rolls reduces crop rejection from the nip inlet back into the cutting zone.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop harvesting header comprising:
   a header frame arranged to be transported in a forward working direction over ground having a standing crop for harvesting;
   a plurality of generally horizontal cutter disks mounted at positions spaced transversely of the header for driven rotation about respective generally upright axes;
   each disk having mounted thereon at a position spaced outwardly from the respective axis thereof at least one cutter blade such that rotation of the disk about its axis causes the standing crop to be cut by the blade as it rotates around the axis on the disk;
   a pair of conditioner rolls mounted transversely to the header frame, the conditioner rolls including a top conditioning roll and a bottom conditioning roll which are parallel and arranged for driven counter-rotation about respective top and bottom conditioner rotation axes such that the crop passes rearwardly through a nip between the top and bottom conditioning rolls, the top and bottom conditioner rolls being arranged such that the nip is located behind the disks with the top conditioner rotation axis situated rearwardly of the bottom conditioner rotation axis; and
   a rear crop deflector mounted transversely to the header frame behind the pair of conditioner rolls and arranged to deflect the cut crop upwardly as said cut crop moves rearwardly from the conditioner rolls;
   wherein the rear crop deflector is maintained in a position that is free of any contact with either of the conditioner rolls, is in non-intermeshing relationship with each of said conditioning rolls at a distance spaced rearwardly therefrom, is intersected by a bisecting plane that bisects the nip, and has a forwardmost point that is located at a spaced distance downwardly from the bisecting plane in order to impart upward and rearward movement through the bisecting plane on crop material arriving at said forwardmost point of the rear crop deflector from the nip of the conditioning rolls.

2. The header according to claim 1 wherein the rear crop deflector comprises a deflector roller supported for rotation about a deflector rotation axis oriented transversely of the frame.

3. The header according to claim 2 wherein the deflector roller is arranged for driven rotation about the deflector rotation axis in a direction conveying the cut crop material rearwardly over the deflector roller.

4. The header according to claim 1 wherein the top and bottom conditioner rollers intermesh with one another.

5. The header according to claim 2 wherein the deflector roller comprises circumferentially spaced ribs.

6. The header according to claim 2 wherein the deflector roller and the conditioning rolls share a common drive system.

7. The header according to claim 6 wherein the deflector roller is driven off of one of the conditioning rolls.

8. The header according to claim 7 wherein the common drive system comprises a flexible drive member entrained about respective shafts of the deflector roller and the one of the conditioning rolls.

9. The header according to claim 7 wherein the flexible drive member is a belt.

10. The header according to claim 8 wherein the deflector roller is adjustable between different positions relative to each of the conditioning rolls, and the common drive system comprises a tensioning mechanism for setting a tension of the flexible member in each of said positions.

11. The header according to claim 10 wherein the deflector roller is supported on the frame by an adjustable bracket that is pivotal about a pivot axis parallel to the deflector rotation axis and slidable back and forth on a sliding axis perpendicular to the pivot axis, whereby for each position of the deflector roller about the pivot axis, the bracket is slidable back and forth to adjust the tension of the flexible member.

12. The header according to claim 1 wherein the rear crop deflector comprises a deflector panel.

13. The header according to claim 1 wherein the disks comprise a central set of disks disposed inwardly of opposing ends of the conditioning rolls, the central set of discs being arranged in cooperative pairs each comprising two adjacent disks that rotate in opposite directions so as to tend to convey crop material in a stream between the adjacent disks.

14. The header according to claim 1 wherein the conditioning rolls and the deflector are mounted in a discharge opening of the frame from which the crop is discharged rearwardly to form a swath directly behind the header.

15. The header according to claim 1 comprising a front deflector mounted transversely to the frame in front of the pair of conditioner rolls and arranged to act on upwardly travelling crop material from the discs to redirect said upwardly travelling crop material downwardly toward the nip.

16. The header according to claim 15 wherein the front deflector comprises a deflector plate lying in generally tangential relation to a lower front quadrant of the top conditioning roll and facing downwardly toward the cutter disks.

* * * * *